(12) United States Patent
Fauth et al.

(10) Patent No.: US 9,055,859 B2
(45) Date of Patent: Jun. 16, 2015

(54) METHOD FOR OPERATION OF A DISHWASHER

(75) Inventors: Michael Fauth, Pleinfeld (DE); Helmut Jerg, Giengen (DE); Kai Paintner, Adelsried (DE); Andreas Reiter, Finningen (DE); Roland Rieger, Rainau (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 1152 days.

(21) Appl. No.: 13/054,796

(22) PCT Filed: Jul. 28, 2009

(86) PCT No.: PCT/EP2009/059723
§ 371 (c)(1),
(2), (4) Date: Jan. 19, 2011

(87) PCT Pub. No.: WO2010/012716
PCT Pub. Date: Feb. 4, 2010

(65) Prior Publication Data
US 2011/0120501 A1    May 26, 2011

(30) Foreign Application Priority Data

Jul. 28, 2008   (DE) .................. 10 2008 040 789
Nov. 7, 2008    (DE) .................. 10 2008 043 550

(51) Int. Cl.
*B08B 9/20*   (2006.01)
*A47L 15/48*  (2006.01)
*A47L 15/42*  (2006.01)

(52) U.S. Cl.
CPC ........... *A47L 15/481* (2013.01); *A47L 15/4285* (2013.01); *A47L 15/4287* (2013.01); *A47L 15/4291* (2013.01); *Y02B 40/44* (2013.01)

(58) Field of Classification Search
CPC .............. A47L 15/481; A47L 15/4285; A47L 15/0013; A47L 15/0034; A47L 15/4257
USPC ......... 134/56 D, 10, 105, 58 D, 57 D; 34/102
See application file for complete search history.

(56) References Cited

U.S. PATENT DOCUMENTS

| | | | |
|---|---|---|---|
| 2004/0134519 A1 | 7/2004 | Jung et al. | |
| 2004/0200508 A1 | 10/2004 | Jung et al. | |
| 2007/0101609 A1 | 5/2007 | Jerg et al. | |
| 2007/0295360 A1 | 12/2007 | Jerg et al. | |
| 2007/0295373 A1 | 12/2007 | Jerg et al. | |
| 2008/0127997 A1* | 6/2008 | Jerg et al. .......... | 134/10 |

FOREIGN PATENT DOCUMENTS

| | | | | |
|---|---|---|---|---|
| DE | 1628632 A1 | 8/1970 | | |
| DE | 0358279 | * 3/1990 | .......... | A47L 15/48 |
| DE | 10353774 A1 | 2/2005 | | |

(Continued)

OTHER PUBLICATIONS

Granting Decision RU 2011103990 dated Sep. 26, 2013.

*Primary Examiner* — Michael Barr
*Assistant Examiner* — Thomas Bucci
(74) *Attorney, Agent, or Firm* — James E. Howard; Andre Pallapies (57) ABSTRACT

A dishwasher and a method for operating a dishwasher, wherein a liquid is heated at least twice with a first heater, and wherein the first heater is an air heater.

39 Claims, 4 Drawing Sheets

(56) References Cited

FOREIGN PATENT DOCUMENTS

| DE | 10353775 | A1 | 2/2005 |
| EP | 1690489 | A2 | 8/2006 |
| WO | 2006129963 | A2 | 12/2006 |

* cited by examiner

METHOD FOR OPERATION OF A DISHWASHER

BACKGROUND OF THE INVENTION

The invention relates to a method for operation of a dishwasher.

Dishwashers are known, which run wash programs comprising a plurality of program steps, like for instance, pre-rinsing, cleaning, intermediate rinsing, rinsing with rinse-aid and drying of the cleaned items to be washed. In this way, during some of the program steps, like for instance the pre-rinsing or cleaning, liquid is heated with a heating means embodied as a flow-through water heater, with this possibly being the same amount of liquid which is heated twice with the flow-through water heater, or two amounts of liquid. The heating process with a flow-through water heater provides for a quick heating of the liquid, which nevertheless exposes sensitive items to be washed to particular loads.

BRIEF SUMMARY OF THE INVENTION

The object underlying the invention is to reduce the thermal loads in particular of sensitive items to be washed.

The invention is based on a method for operating a dishwasher, in particular a household dishwasher, in which liquid is heated at least twice with a first heating means.

In accordance with the invention, provision is made for an air heater (HZ) to be used as a first heating means. The air heater is therefore operated at least twice during a wash program in order to effect a heating of one or two amounts of liquid. This allows for a heating process which is gentle on the items to be washed.

In a development, provision is made for a water heater to be used as the second heating means. This provides for a further, quicker heating process without extending the wash program duration.

In a development, provision is made for a desorption of a reversibly dehydrogenizeable drying material, in particular zeolite, to be effected at least partially during the heating process with the air heater. The desorption thus takes place in two phases, which are separated from one another for instance by means of a complete or partial change in liquid by means of pumping and refilling. A complete desorption of the drying material is then also ensured if the duration of a first program step is not sufficient to achieve a complete desorption.

Provision is made in a development for the method to run a plurality of program steps, with the first heating means being operating at least temporarily during at least two program steps.

Provision is also made in a development for the second heating means to only be operated at least temporarily during a program step. A particularly energy-efficient operation of the dishwasher is thus possible.

Provision is made here in a development for at least one at least temporary change in liquid to take place between the at least two program steps by means of pumping and refilling.

Provision is also made in a development for a pre-rinsing with cleaning action without the addition of detergent to be implemented as a first program step and a cleaning with the addition of detergent and cleaning action to be implemented as a second program step. This provides for a particularly intensive cleaning of the items to be washed, since heated liquid is already applied to the items to be washed during the pre-rinsing program step.

In a development, provision is made for a cleaning with the addition of detergent and detergent action to be implemented as a first program step and a rinsing with the addition of rinse-aid to be implemented as a second program step. This effects a particularly good drying of the items to be washed, since prior to the drying program step, heated liquid is applied to the items to be washed during the rinsing with rinse-aid program step.

In a development, provision is made for liquid to be heated with the first heating means to up to a maximum temperature of essentially between 35 to 50° C., in particular between 40 to 45° C. Once these temperatures have been reached, an improved cleaning action can be achieved during a pre-rinsing program step and/or an improvement in the drying performance can be achieved during a drying program step.

In a development, provision is made for liquid to be heated with the second heating means to a maximum temperature of essentially between 45 to 80° C., preferably 55 to 75° C. An essentially complete desorption of the drying material is thus ensured.

Provision is made here in a development for the period of operation of the first heating means during the first program step to be 2 to 6, preferably 3 to 4 times as long as during the second program step.

The object of the invention is also achieved by a dishwasher, in particular a household dishwasher, having a first heating means, with which liquid can be heated at least twice, with provision being made in accordance with the invention for the first heating means to be embodied as an air heater.

Developments of the inventive dishwasher are specified in the subclaims.

BRIEF DESCRIPTION OF THE DRAWINGS

The invention and its development are described in more detail below with the aid of drawings, in which.

DETAILED DESCRIPTION OF EXEMPLARY EMBODIMENTS OF THE PRESENT INVENTION

Figure 1:
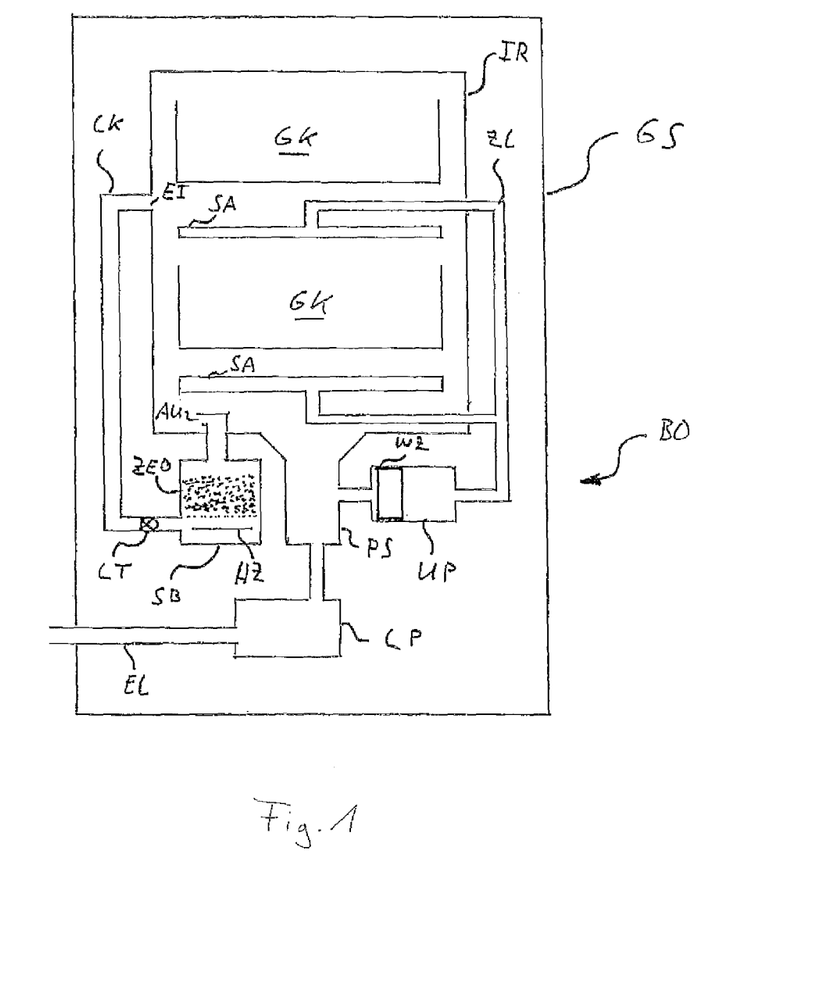
FIG. 1 shows a schematic representation of an exemplary embodiment of an inventive dishwasher having a sorption drying system.

Reference is firstly made to FIG. 1.

A dishwasher GS embodied in the present exemplary embodiment as a household dishwasher comprises an interior IR which is used as a wash tub, it being possible to open and close said interior for loading and unloading purposes by means of a door (not shown) which is pivotably hinged to the dishwasher GS. Racks GK for receiving items to be washed are provided in the interior IR of the dishwasher GS, it being possible to remove said racks from the interior IR of the dishwasher GS in order to facilitate the loading and unloading processes.

To clean the items to be washed which are stored in the racks GK, provision is made for means, which are embodied in the interior IR of the dishwasher GS as spray arms SA, for applying liquid to the items to be washed, with it being possible for the liquid to be water mixed with detergent or rinse-aid for instance in order thus to bring about a cleaning action and/or streak-free drying process. The liquid discharged from the items to be washed collects in a sump PS, which is arranged in the bottom region of the interior IR of the dishwasher GS.

The spray arms SA are connected in a liquid-conducting manner to a circulating pump UP by way of a feed pipe ZL, said circulating pump UP being arranged adjacent to other components of the dishwasher GS in a bottom module BO below the interior IR of the dishwasher GS. During operation, i.e. with a functioning circulating pump UP, the circulating pump UP draws in the liquid accumulating in the sump PS and transports this through the feed pipe ZL to the spray arms SA. In order to heat the liquid which is circulated during operation of the circulating pump UP, the circulating pump comprises an integrated water heater WZ for heating the liquid. Alternatively, in addition to the circulating pump UP, a separate flow-through water heater or another water heater can be provided. A drain pump LP is provided to empty the interior IR of the dishwasher GS, said drain pump likewise being connected in a liquid-conducting manner to the sump PS and possibly being connected to a domestic waste water disposal network using a waste disposal line EL.

The dishwasher GS also comprises a sorption drying system, with which items to be washed which are cleaned and arranged in the racks GR can be dried at the end of a wash program cycle. To this end, a sorption container SB is provided in the bottom module BO, said sorption container being connected in an air-conducting manner to an inlet EI via an air duct LK, with a fan LT being provided to generate a forced flow. A blow-out opening AU is provided in the bottom region of the interior IR of the dishwasher G in order to transport the air drawn-in through the inlet El and routed into the sorption container through the fan LT back into the interior IR of the dishwasher GS.

To effect a drying of the cleaned items to be washed, air is drawn out of the interior IR of the dishwasher GS by means of the fan LT, routed through the sorption container SB and back into the interior IR of the dishwasher GS through the blow-out opening AU. In order herewith to dry the air circulated, a drying means is provided in the sorption container SB in order to implement an exothermic drying process. This is a reversibly dehydronizeable drying material, e.g. zeolite, which, as a result of its hydroscopic property, absorbs water, with thermal energy being released at the same time. This released thermal energy heats the circulated air, which at the same time increases the moisture absorption ability of the circulated air. An amount of liquid is stored in the drying material ZEO at the end of a drying process.

An air heater HZ is provided in order to reproduce the absorption ability of the drying means ZEO for a renewed wash program cycle, said air heater, in the present exemplary embodiment, being arranged in the sorption container SB. It is however also possible to arrange an air heater outside of the sorption container SB, e.g. in the air duct LK, in order to heat the air conveyed into the sorption container SB. To expel the amount of liquid stored in the drying material ZEO, an air flow generated with the fan LT is heated so that the drying material ZEO can be heated to temperatures at which the amount of water stored in the drying material ZEO can be released again.

Figure 2:
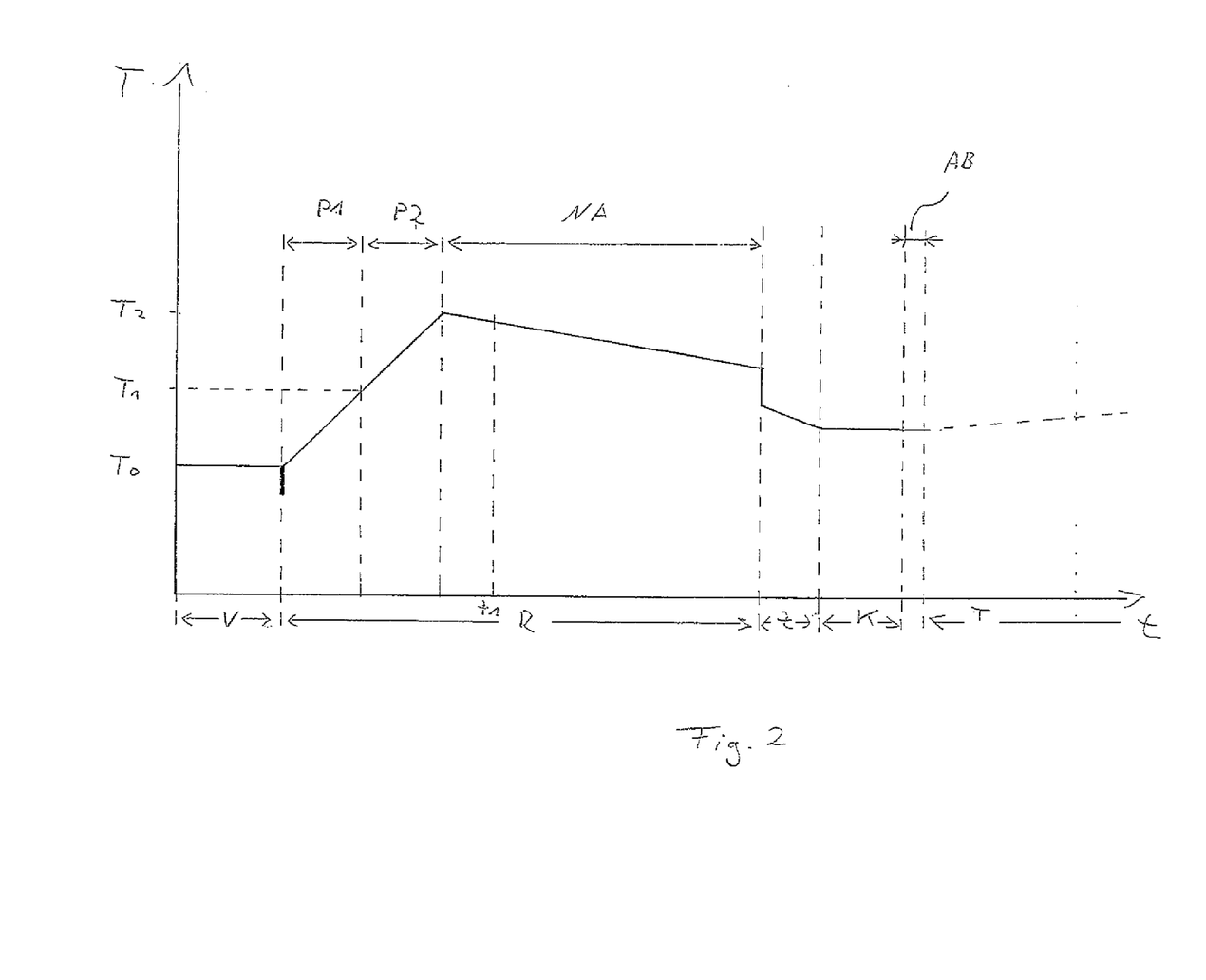
FIG. 2 shows a schematic representation of the temperature gradation during a first exemplary embodiment of an inventive wash program cycle.
Figure 3:
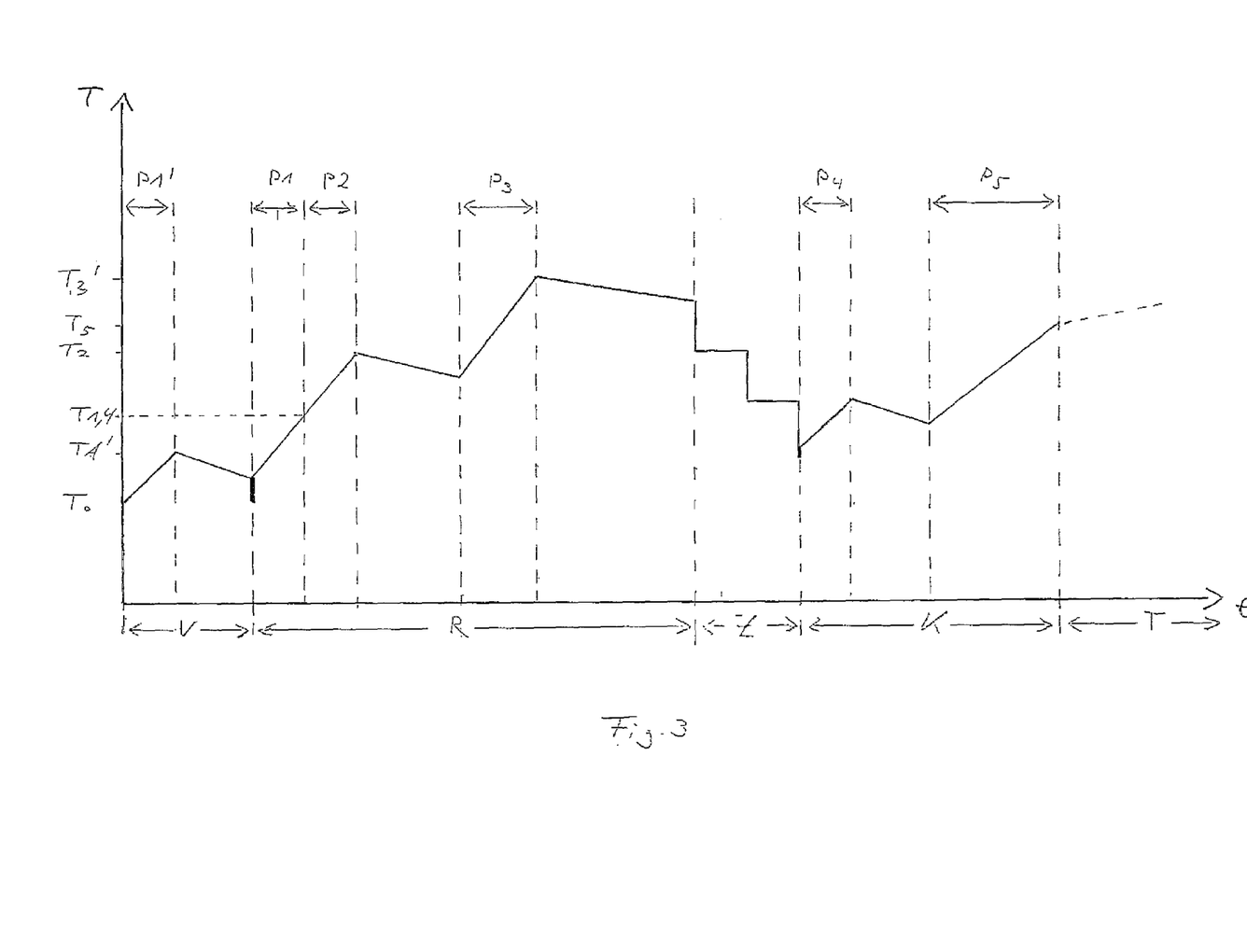
FIG. 3 shows a schematic representation of the temperature gradation of a further, second exemplary embodiment of an inventive wash program cycle.
Figure 4:
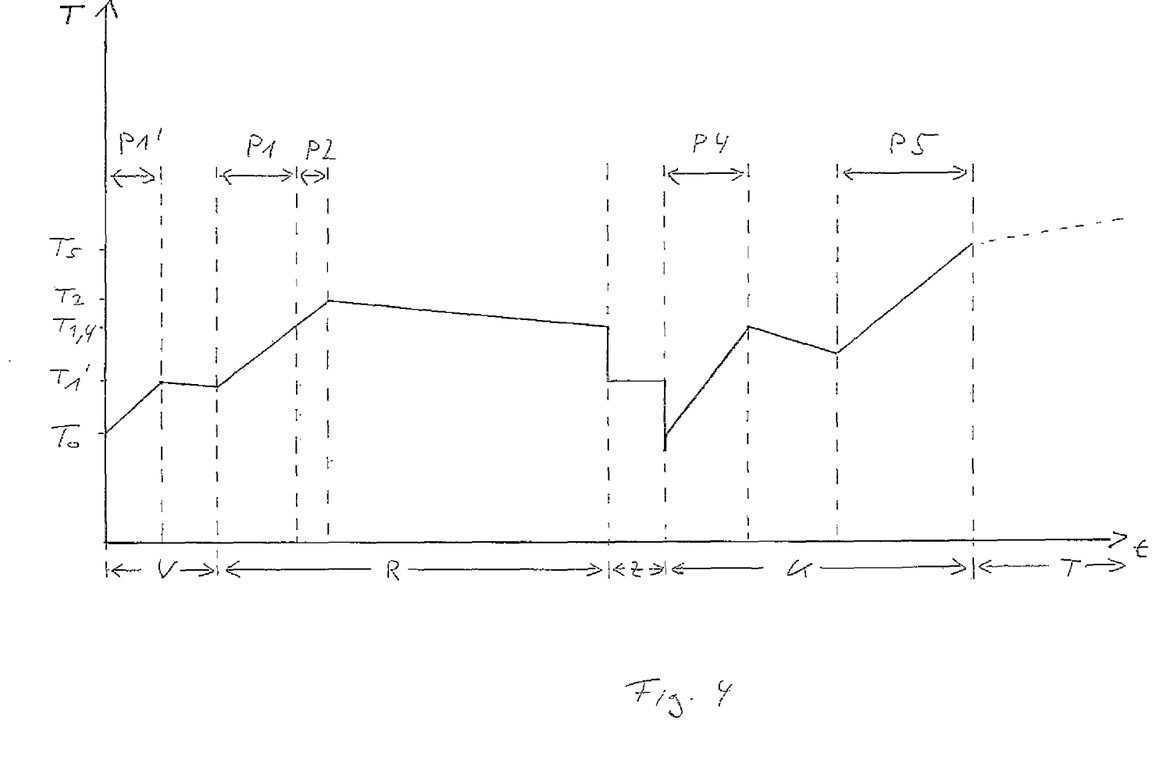
FIG. 4 shows a schematic representation of the temperature gradation of a further, third exemplary embodiment of an inventive wash program cycle.

Reference is now also made to FIGS. 2 to 4.

Dishwashers GS run wash programs for cleaning and drying items to be washed, said wash programs consisting of a plurality of program steps which are run one after the other. A program of this type can consist of the program steps pre-rinsing V, cleaning R, intermediate rinsing Z, rinsing with rinse-aid K and drying T, with it also being possible for individual program steps, like for instance the pre-rinsing V or intermediate rinsing Z, to be faded out, while it is also conceivable to run individual program steps repeatedly, like for instance the intermediate rinsing Z. During the pre-rinsing V, water is applied to the items to be washed for instance without the addition of detergent, with this either being implemented with unheated water or with water heated by means of a heater. To this end, water that was stored in a water tank (not shown) can be used. A water tank of this type can be connected in a heat-conducting manner to the surroundings of the dishwasher, so that liquid stored intermediately in the water tank, like for instance water from a domestic supply system, can heat up to room temperature. In the cleaning step R, the items to be washed are cleaned by applying water mixed with detergent, i.e. the addition of detergent is effected during the cleaning step. Furthermore, the liquid is heated in order thus to increase the cleaning action of the detergent. Here the cleaning step R is composed of a heating phase P1, P2, in which the liquid in the dishwasher GS is heated by means of heating means, until a predetermined maximum temperature is reached and a subsequent post-wash phase, during which the slowly cooling liquid is circulated by means of the circulating pump UP when the heating means is switched off. In the intermediate rinsing program step Z, liquid is applied to the items to be washed in order thus to transport dirt residues out of the dishwasher GS. The next program step is the rinsing with rinse-aid K for preparing the drying program step T, in which water mixed with rinse-aid is circulated by means of the circulating pump and is applied to the now cleaned items to be washed by way of the spray arms SA. The drying program step T then takes place, in which liquid is no longer applied to the items to be washed, but an air flow circulating through the interior IR of the dishwasher GS and the sorption container SB is instead generated by operating the fan LT. A complete or at least partial exchange of liquid can be implemented between the individual program steps, i.e. the dishwasher GS is emptied by means of the drain pump LP and the waste disposal line EL and is refilled again by a supply line (not shown) which establishes a connection with a domestic supply system.

With the wash program cycle according to FIG. 2, liquid is only heated in the cleaning program step R. Here during a first phase P1, starting from a start temperature T0, the liquid circulated with the circulating pump IP is initially heated by the air heater HZ in the sorption container SB to a maximum temperature T1, with the fan LT simultaneously generating an air flow which circulates through the interior IR of the dishwasher GS. The air heater HZ heats the drying material ZEO in the sorption container SB to temperatures at which the amount of water stored in the drying material ZEO is expelled out of the drying material ZEO and is transported in the interior IR of the dishwasher GS through the blow-out opening AU. The effect of the air heater HZ heats this amount of liquid and thus effects a heating of the total amount of liquid in the interior IR of the dishwasher GS by mixing the liquid already circulated with the circulating pump UP. As a result of a heating up to the first temperature T1 taking place by means of the air heater HZ during the cleaning program step R, it is ensured that the drying material ZEO can be reliably and completely desorbed from the interior IR of the dishwasher GS by circulating relatively cold and dry air. Instead of a rigid wash program cycle, during which a desorption process is implemented in a first program section, in which liquid is heated, provision can also be made in an alternative exemplary embodiment to evaluate the parameters influencing the desorption process in order to determine the point in time at which the desorption is implemented. This may be the air temperature and the water inflow temperature. For instance, a desorption process can take place in a cleaning or rinsing with rinse-aid program step or also, if expedient, during the pre-rinsing program step.

During the desorption process, the air heater HZ cools the blow-out opening AU in the interior IR of the dishwasher GS in order thus to ensure that no excessive heating of the blow-out opening HZ with overheating damage results due to the heating output of the air heater HZ.

To this end, the circulating pump UP is operated during the operation of the air heater HZ, i.e. during the phase P1 for instance, so that liquid is transported by the circulating pump from the sump PS through the feed pipe to the spray arm SA. The spray arms SA are herewith made to rotate and by spraying the blow-out opening AU, in particular a casing covering the blow-out opening AU, with liquid, effect a cooling of the same.

In a next phase P2 of the cleaning program step R, the amount of liquid is heated by means of the water heater WZ starting from the first temperature T1 to the second temperature T2.

To increase the cleaning action during the cleaning program step R, provision is made to increase the spray pressure of the water jets originating from the spray arm SA by increasing the speed of the circulating pump UP. To this end, during the cleaning program step R, during the post-wash phase NA, the amount of liquid circulated by means of the circulating pump UP is increased by a post-filling step, for instance at point in time t1 (cf FIG. 2) and the speed of the circulating pump UP is then increased, e.g. continuously until the circulating pump proceeds again rotationally, i.e. does not draw in any air bubbles during operation, which reduces the delivery rate of the circulating pump UP and results in the development of unwanted noise. It is herewith possible to take the amount of liquid released during the desorption process, which was stored in the drying material ZEO, into account when assessing the amount of liquid to be filled and thus to reduce the overall water requirement with an improved cleaning capacity.

A drip phase AB is provided between the rinsing with rinse-aid program step K and the drying program step T (cf. FIG. 2), while the liquid adhering to the cleaned items to be washed, i.e. water mixed with rinse-aid, can drain off from the items to be washed due to gravity and can collect in the sump PS of the interior IR of the dishwasher GS. The amount of liquid to be absorbed by the sorption drying system is herewith reduced and therefore the duration of the drying program step T.

A pumping process, during which the liquid mixed with rinse-aid is routed through the waste disposal line EL into a domestic waste water disposal system by means of the drain pump LP, takes place prior to this drip phase AB, i.e. at the end of the rinsing with rinse-aid program step K. The drip phase AB follows, during which neither the circulating pump UP nor the drain pump LP and nor the fan LT nor one of the cited heaters HZ, WZ are in operation. Upon completion of this drip phase AB, the drying program step T begins by commissioning the fan LT, so that an air flow circulating through the interior IR of the dishwasher and the sorption container SB is generated in order to dry the cleaned items to be washed in the racks GK. At the end of the drying program step T, a further pumping process takes place by means of the drain pump LP, by means of which a remaining amount of liquid is transported out of the dishwasher GS through the waste disposal line EL into a domestic waste water disposal system. Alternatively, to this end provision can also be made to implement a further pumping process in addition or alternatively to starting the drying program step T.

With the wash program according to FIGS. 3 and 4, liquid is heated in the first of the program steps, the pre-rinsing program step V. To this end, during a phase P1', liquid is heated starting from a start temperature T0 to a temperature T1' by means of the air heater HZ, at which temperature T1', as described above, an air flow circulating through the interior IR of the dishwasher GS and the sorption container SB is generated by means of the fan LT. After reaching the temperature T1', the air heater HZ is deactivated. At this point in time, the drying material ZEO is still not completely desorbed, i.e. a residual amount of water is stored in the drying material ZEO. To expel this residual amount of water from the drying material ZEO and thus to have a completely water-absorbable drying material ZEO available again at the start of the drying program step T, in the subsequent cleaning program step R the liquid is firstly heated to a temperature T1 by means of the aid heater HZ and is then heated to the temperature T2 by operating the water heater. In other words, the desorption phase of the drying means ZEO in the sorption container SB is divided in this exemplary embodiment and arranged into two program steps, namely the pre-rinsing program step V and the cleaning program step R.

To increase the cleaning action by further increasing the temperature, a further phase P3 (cf. FIG. 3) can be provided, during which a further heating of the liquid to a temperature T3 takes place with the water heater WZ.

To improve the drying result at the end of the drying program step T, provision is made in the exemplary embodiments according to FIGS. 3 and 4 for liquid to be heated during the rinsing with rinse-aid program step K. To this end, during a phase P4, liquid, which is either water or water mixed with rinse-aid, is heated to a temperature T4 by means of the water heater WZ. Alternatively the air heater HZ can also be used instead of the water heater, in order for instance to achieve a desorption which was previously incomplete in the program cycle. In addition, during a further phase P5, the liquid can be further heated to a temperature T5 in order to improve the drying with the sorption drying system.

LIST OF REFERENCE CHARACTERS

AB drip phase
AU blow-out opening
BO bottom module
El inlet
EL waste disposal line
GK rack
GS dishwasher
HZ air heater
IR interior
LK air duct
LP drain pump
LT fan
NA post-wash phase
P1' phase 1'
P1 phase 1
P2 phase 2
P3 phase 3
P4 phase 4
P5 phase 5
PS sump
SA spray arm
SB sorption container t1 post-fill point in time
T0 start temperature
T1' temperature
T1 temperature
T2 temperature
T3 temperature
T4 temperature
T5 temperature
UP circulating pump
WZ water heater
ZEO drying material
ZL feed pipe

The invention claimed is:

1. A method for operating a dishwasher, wherein the dishwasher includes:
 a first heater to heat liquid at least twice, wherein the first heater is an air heater;
 a sorption drying system having reversibly dehydrogenizable drying material; and
 a control unit programmed to control an operation of the first heater, wherein the control unit is programmed to operate the first heater to heat liquid at least twice during a wash program,
 the method comprising:
 performing a plurality of program steps of the wash program and heating the liquid at least twice with the first heater, wherein the first heater is the air heater, wherein the first heater is operated at least temporarily during at least two program steps of the plurality of program steps; and
 performing a desorption phase of the reversibly dehydrogenizable drying material of the sorption drying system, wherein the desorption phase is divided into at least two program steps, and wherein the first heater heats the liquid during a rinse-aid program step to complete a desorption of any of the reversibly dehydrogenizable drying material which was incomplete prior to the rinse-aid program step.

2. The method of claim 1, wherein the dishwasher is a household dishwasher.

3. The method of claim 1, wherein a water heater is used as a second heater, and wherein the second heater heats the liquid at least temporarily during at least two program steps of the plurality of program steps.

4. The method of claim 1, wherein, during the heating with the air heater, a desorption of the reversibly dehydratable drying material of the sorption drying system is at least partially effected.

5. The method of claim 4, wherein the reversibly dehydratable drying material is zeolite.

6. The method of claim 1, wherein the first heater is operated at least twice at least temporarily during at least one of the plurality of program steps.

7. The method of claim 3, wherein the second heater is only operated at least temporarily during one of a plurality of program steps.

8. The method of claim 1, wherein at least one at least partial change in the liquid takes place between the at least two of the plurality of program steps by means of pumping and refilling.

9. The method of claim 1, wherein a pre-rinsing with cleaning action and without addition of detergent is implemented as a first of the at least two of the plurality of program steps, and wherein a cleaning with addition of the detergent and the cleaning action is implemented as a second of the at least two of the plurality of program steps.

10. The method of claim 1, wherein a cleaning with addition of detergent and cleaning action is implemented as a first of the at least two of the plurality of program steps, and wherein a rinsing with addition of rinse-aid is implemented as a second of the at least two of the plurality of program steps.

11. The method of claim 1, wherein the liquid is heated with the first heater to a maximum temperature of essentially between 35° C. to 50° C.

12. The method of claim 11, wherein the maximum temperature is between 40° C. to 45° C.

13. The method of claim 3, wherein the liquid is heated with the second heater to a maximum temperature of essentially between 45° C. to 80° C.

14. The method of claim 13, wherein the maximum temperature is between 55° C. to 75° C.

15. The method of claim 1, wherein a first operation period of the first heater during a first of the at least two of the plurality of program steps is 2 to 6 times as long as a second operation period of the first heater during a second of the at least two of the plurality of program steps.

16. The method of claim 15, wherein the first operation period of the first heater is 3 to 4 times as long as the second operation period of the first heater.

17. A dishwasher, comprising:
 a first heater to heat liquid at least twice, wherein the first heater is an air heater;
 a sorption drying system having reversibly dehydrogenizable drying material; and
 a control unit programmed to run a plurality of program steps of a wash program and to control an operation of the first heater,
 wherein the control unit is programmed to operate the first heater to heat liquid at least temporarily during at least two program steps of the plurality of program steps,
 wherein the control unit is programmed to control a desorption phase of the reversibly dehydrogenizable drying material of the sorption drying system,
 wherein the desorption phase is divided into at least two program steps, and
 wherein the control unit is programmed to control the first heater to heat the liquid during a rinse-aid program step to achieve a desorption which may be previously incomplete in a program cycle.

18. The dishwasher of claim 17, wherein the dishwasher is a household dishwasher.

19. The dishwasher of claim 17, further comprising a second heater,
 wherein the second heater is a water heater; and
 wherein the control unit is programmed to control the second heater to heat the liquid at least temporarily during at least two program steps of the plurality of program steps.

20. The dishwasher of claim 17, wherein the control unit is programmed to control the air heater to effect at least partially a desorption of the reversibly dehydratable drying material during a heating process.

21. The dishwasher of claim 20, wherein the reversibly dehydratable drying material is zeolite.

22. The dishwasher of claim 17, wherein the control unit is programmed to control the first heater to operate at least twice at least temporarily during at least one of the plurality of program steps of the wash program.

23. The dishwasher of claim 17, wherein the control unit is programmed to control the first heater to operate at least temporarily during at least two of the plurality of program steps of the wash program, and wherein the liquid is heated during the at least two of the plurality of program steps of the wash program.

24. The dishwasher of claim 19, wherein the control unit is programmed to control the second heater such that the second heater is only operable at least temporarily during one of the plurality of program steps of the wash program.

25. The dishwasher of claim 23, wherein the control unit is programmed to control the wash program such that at least one at least partial change in the liquid takes place between the at least two of the plurality of program steps of the wash program by means of pumping and refilling.

26. The dishwasher of claim 23, wherein a first of the at least two program steps is pre-rinsing with cleaning action and without addition of detergent, and wherein a second of the at least two program steps is cleaning with addition of the detergent and cleaning action.

27. The dishwasher of claim 23, wherein a first of the at least two program steps is cleaning with addition of detergent and cleaning action, and wherein a second of the at least two program steps is rinsing with addition of rinse-aid.

28. The dishwasher of claim 23, wherein the control unit is programmed to control the first heater to heat the liquid to a maximum temperature of essentially between 35° C. to 50° C.

29. The dishwasher of claim 28, wherein the maximum temperature is between 40° C. to 45° C.

30. The dishwasher of claim 19, wherein the control unit is programmed to control the second heater to heat liquid to a maximum temperature of essentially between 45° C. to 80° C.

31. The dishwasher of claim 30, wherein the maximum temperature is between 55° C. to 75° C.

32. The dishwasher of claim 22, wherein the control unit is programmed to control the first heater to operate during a first operation period during the first of a plurality of program steps that is 2 to 6 times as long as a second operation period of the first heater during a second of the plurality of program steps.

33. The dishwasher of claim 32, wherein the first operation period is 3 to 4 times as long as the second operation period.

34. The dishwasher of claim 17, further comprising:
a wash tub;
a circulating pump configured to circulate the liquid through the wash tub; and
a fan configured to circulate an airflow through the wash tub and the sorption drying system,
wherein the control unit is programmed to control the air heater, circulating pump, and fan to heat the liquid with the air heater while the circulating pump circulates the liquid and the fan simultaneously circulates the airflow.

35. The dishwasher of claim 34, wherein the control unit is programmed to control the air heater during a first phase of a cleaning program step to heat the liquid with the air heater from a start temperature to a predetermined temperature.

36. The dishwasher of claim 34, further comprising:
a spray arm in the wash tub, the spray arm in communication with the circulating pump,
wherein the control unit is programmed to control the circulating pump to circulate the liquid through the spray arm during the heating of the liquid with the air heater.

37. The dishwasher of claim 1, wherein the control unit is programmed to deactivate the first heater between a first operation of the first heater and a second operation of the first heater during at least one step of the plurality of program steps of the wash program.

38. A dishwasher, comprising:
a first heater to heat liquid at least twice, wherein the first heater is an air heater;
a second heater to heat the liquid, wherein the second heater is a water heater;
a sorption drying system having reversibly dehydrogenizable drying material; and
a control unit programmed to run a plurality of program steps of a wash program and to control an operation of the first heater, wherein the control unit is programmed to operate the first heater to heat liquid at least temporarily during at least two program steps of the plurality of program steps, wherein the control unit is programmed to control a desorption phase of the reversibly dehydrogenizable drying material of the sorption drying system, wherein the desorption phase is divided into at least two program steps, and wherein the control unit is programmed to control the second heater to heat the liquid at least temporarily during at least two program steps of the plurality of program steps.

39. The dishwasher of claim 38, wherein the control unit is programmed to control the first heater to heat the liquid during a rinse-aid program step to complete a desorption of any of the reversibly dehydrogenizable drying material which was incomplete prior to the rinse-aid program step.

* * * * *